US011142025B2

(12) United States Patent
Koishikawa

(10) Patent No.: US 11,142,025 B2
(45) Date of Patent: Oct. 12, 2021

(54) PNEUMATIC TIRE

(71) Applicant: The Yokohama Rubber Co., LTD., Tokyo (JP)

(72) Inventor: Yoshifumi Koishikawa, Hiratsuka (JP)

(73) Assignee: The Yokohama Rubber Co., LTD.

(*) Notice: Subject to any disclaimer, the term of this patent is extended or adjusted under 35 U.S.C. 154(b) by 308 days.

(21) Appl. No.: 15/756,552

(22) PCT Filed: Aug. 4, 2016

(86) PCT No.: PCT/JP2016/073003
§ 371 (c)(1),
(2) Date: Feb. 28, 2018

(87) PCT Pub. No.: WO2017/043227
PCT Pub. Date: Mar. 16, 2017

(65) Prior Publication Data
US 2018/0272811 A1 Sep. 27, 2018

(30) Foreign Application Priority Data

Sep. 7, 2015 (JP) .............................. JP2015-176021

(51) Int. Cl.
*B60C 11/04* (2006.01)
*B60C 11/03* (2006.01)
*B60C 11/12* (2006.01)

(52) U.S. Cl.
CPC .............. *B60C 11/04* (2013.01); *B60C 11/03* (2013.01); *B60C 11/12* (2013.01);
(Continued)

(58) Field of Classification Search
CPC ..... B60C 2011/1254; B60C 2011/0381; B60C 2011/0383; B60C 2011/1209;
(Continued)

(56) References Cited

U.S. PATENT DOCUMENTS

2011/0186199 A1* 8/2011 Miyazaki ................ B60C 11/12
152/209.18
2012/0090750 A1 4/2012 Kuwajima
(Continued)

FOREIGN PATENT DOCUMENTS

JP 63159110 A * 7/1988
JP H0848114 A * 2/1996
(Continued)

OTHER PUBLICATIONS

English translation of JP-2012076718-A by EPO (Year: 2012).*
(Continued)

*Primary Examiner* — Leith S Shafi
*Assistant Examiner* — Inja Song
(74) *Attorney, Agent, or Firm* — Thorpe North & Western

(57) ABSTRACT

A pneumatic tire comprises circumferential main grooves extending in the tire circumferential direction and land portions defined by the circumferential main grooves. The land portions are each provided with a plurality of groove units which are sets including a first groove, a second groove, and a third groove. The first groove, the second groove, the third groove are disposed without meeting one another, and radially extend at intervals from each other ranging from 90 degrees to 150 degrees. Additionally, the first groove is a lug groove with the groove width ranging from 1.5 mm to 4.0 mm and has a semi-closed structure, opening to the circumferential main groove or the tire ground contact edge at a first end portion and terminating within the land portion at a second end portion.

32 Claims, 8 Drawing Sheets

(52) U.S. Cl.
CPC ... B60C 11/1204 (2013.01); *B60C 2011/0344* (2013.01); *B60C 2011/0365* (2013.01); *B60C 2011/0381* (2013.01); *B60C 2011/0386* (2013.01); *B60C 2011/1254* (2013.01)

(58) Field of Classification Search
CPC ... B60C 2011/039; B60C 11/04; B60C 11/03; B60C 11/12; B60C 11/1204; B60C 2011/0344; B60C 2011/0365; B60C 2011/0386; B60C 11/0306; B60C 2011/0367; B60C 2011/036; B60C 11/0304; B60C 11/032
See application file for complete search history.

(56) References Cited

U.S. PATENT DOCUMENTS

| | | |
|---|---|---|
| 2014/0283966 A1 | 9/2014 | Horiguchi |
| 2014/0367013 A1 | 12/2014 | Chambriard et al. |
| 2015/0114535 A1 | 4/2015 | Kuwajima |

FOREIGN PATENT DOCUMENTS

| | | | |
|---|---|---|---|
| JP | 2010167989 A | * | 8/2010 |
| JP | 2011-011695 | | 1/2011 |
| JP | 2012076718 A | * | 4/2012 |
| JP | 2013-151235 | | 8/2013 |
| JP | 2014-180948 | | 9/2014 |
| JP | 2015-504808 | | 2/2015 |
| JP | 2015071373 A | * | 4/2015 |
| JP | 2015-134575 | | 7/2015 |
| JP | 2015-134580 | | 7/2015 |
| WO | WO 2011/001793 | | 1/2011 |
| WO | WO 2013/092581 | | 6/2013 |

OTHER PUBLICATIONS

English translation of JPH0848114 A by EPO (Year: 1996).*
International Search Report for International Application No. PCT/JP2016/073003 dated Nov. 1, 2016, 2 pages, Japan.
Notice of Reasons for Refusal for Japanese Patent Application No. 2015-176021 dated Jan. 22, 2020, 8 pages, Japan.

* cited by examiner

| | COMPARATIVE EXAMPLE 1 | COMPARATIVE EXAMPLE 2 | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 | EXAMPLE 10 |
|---|---|---|---|---|---|---|---|---|---|---|---|---|
| GROOVE UNIT STRUCTURE | FIG. 8 | FIG. 9 | FIG. 4 | FIG. 4 | FIG. 4 | FIG. 4 | FIG. 4 | FIG. 4 | FIG. 4 | FIG. 6 | FIG. 4 | FIG. 4 |
| α (DEGREES) | - | 60 | 120 | 132 | 107 | 120 | 120 | 120 | 120 | 120 | 120 | 120 |
| β (DEGREES) | - | 100 | 120 | 108 | 133 | 120 | 120 | 120 | 120 | 120 | 120 | 120 |
| γ (DEGREES) | - | 200 | 120 | 120 | 120 | 120 | 120 | 120 | 120 | 120 | 120 | 120 |
| θ1 (DEGREES) | 48 | 48 | 48 | 48 | 48 | 48 | 48 | 48 | 48 | 48 | 48 | 48 |
| θ2 (DEGREES) | 12 | 72 | 12 | 0 | 25 | 12 | 12 | 12 | 12 | 12 | 12 | 12 |
| Da (mm) | 0 | 1.5 | 1.5 | 1.5 | 1.5 | 0.8 | 4.5 | 1.5 | 1.5 | 1.5 | 1.5 | 1.5 |
| Db (mm) | 0 | 1.5 | 1.5 | 1.5 | 1.5 | 0.8 | 4.5 | 1.5 | 1.5 | 1.5 | 1.5 | 1.5 |
| Wg1 (mm) | 2.0 | 2.0 | 2.0 | 2.0 | 2.0 | 2.0 | 2.0 | 1.6 | 3.5 | 1.8 | 2.0 | 2.0 |
| Wg2 (mm) | 0.8 | 0.8 | 0.8 | 0.8 | 0.8 | 0.8 | 0.8 | 0.8 | 0.8 | 0.8 | 0.8 | 1.2 |
| Wg3 (mm) | 1.2 | 1.2 | 1.2 | 1.2 | 1.2 | 1.2 | 1.2 | 1.0 | 1.8 | 2.0 | 1.2 | 1.0 |
| SIZE RELATIONSHIP OF GROOVE WIDTH | Wg2 < Wg3 < Wg1 | Wg2 < Wg3 < Wg1 | Wg2 < Wg3 < Wg1 | Wg2 < Wg3 < Wg1 | Wg2 < Wg3 < Wg1 | Wg2 < Wg3 < Wg1 | Wg2 < Wg3 < Wg1 | Wg2 < Wg3 < Wg1 | Wg2 < Wg3 < Wg1 | Wg2 < Wg1 < Wg3 | Wg2 < Wg3 < Wg1 | Wg3 < Wg2 < Wg1 |
| SIZE RELATIONSHIP OF GROOVE DEPTH | H2 < H3 < H1 | H2 < H3 < H1 | H2 < H3 < H1 | H2 < H3 < H1 | H2 < H3 < H1 | H2 < H3 < H1 | H2 < H3 < H1 | H2 < H3 < H1 | H2 < H3 < H1 | H2 < H3 < H1 | H2 < H1 < H3 | H3 < H2 < H1 |
| WET PERFORMANCE | 100 | 95 | 102 | 101 | 103 | 103 | 101 | 101 | 105 | 104 | 104 | 103 |
| DRY PERFORMANCE | 100 | 105 | 105 | 107 | 103 | 103 | 108 | 107 | 103 | 103 | 103 | 103 |

FIG. 7

COMPARATIVE EXAMPLE 1

COMPARATIVE EXAMPLE 2

PNEUMATIC TIRE

TECHNICAL FIELD

The present technology relates to a pneumatic tire and particularly relates to a pneumatic tire that can provide good wet performance and dry performance in a compatible manner.

BACKGROUND ART

A typical pneumatic tire is provided with lug grooves in the land portions to ensure wet performance and snow performance. An example of a pneumatic tire in the related art that is configured in this manner is the technology described in Japanese Unexamined Patent Application Publication No. 2013-151235.

Generally, by increasing the groove area of the land portion, the drainage effect of the grooves is increased and wet performance is improved. However, the decrease in rigidity of the land portions causes a decrease in dry performance of the tire.

SUMMARY

The present technology provides a pneumatic tire that can provide good wet performance and dry performance in a compatible manner.

A pneumatic tire according to an embodiment of the present technology comprises:
- a circumferential main groove extending in a tire circumferential direction; and
- a plurality of land portions defined by the circumferential main groove;
- the plurality of land portions each comprising a plurality of groove units each composed of a set comprising a first groove, a second groove, and a third groove;
- the first groove, the second groove, and the third groove being disposed without meeting one another and radially extending at intervals from each other ranging from 90 degrees to 150 degrees; and
- the first groove being a lug groove with a groove width ranging from 1.5 mm to 4.0 mm and having a semi-closed structure, opening to the circumferential main groove or a tire ground contact edge at a first end portion and terminating within the land portion at a second end portion.

In a pneumatic tire according to the present technology, a groove unit including a set of three grooves ensures the wet performance of the tire. Additionally, by the grooves being disposed without meeting one another, the rigidity of land portions is ensured and the dry performance of the tire is ensured. Furthermore, by the grooves radially extending at the intervals from each other ranging from 90 degrees to 150 degrees, compared to a configuration in which the grooves are unevenly distributed, the rigidity of the land portions is efficiently ensured and the dry performance of the tire is efficiently improved. By a first groove being a lug groove, the drainage properties of the land portions are ensured and the wet performance of the tire is ensured. This has the advantage that good wet performance and dry performance can be provided in a compatible manner.

BRIEF DESCRIPTION OF DRAWINGS

FIG. 7 is a table showing the results of performance tests of pneumatic tires according to embodiments of the present technology.

DETAILED DESCRIPTION

Embodiments of the present technology are described in detail below with reference to the drawings. However, the present technology is not limited to these embodiments. Moreover, constituents of the embodiments include elements that are substitutable while maintaining consistency with the technology, and obviously substitutable elements. Furthermore, the modified examples described in the embodiments can be combined as desired within the scope apparent to those skilled in the art.

Pneumatic Tire

Figure 1:
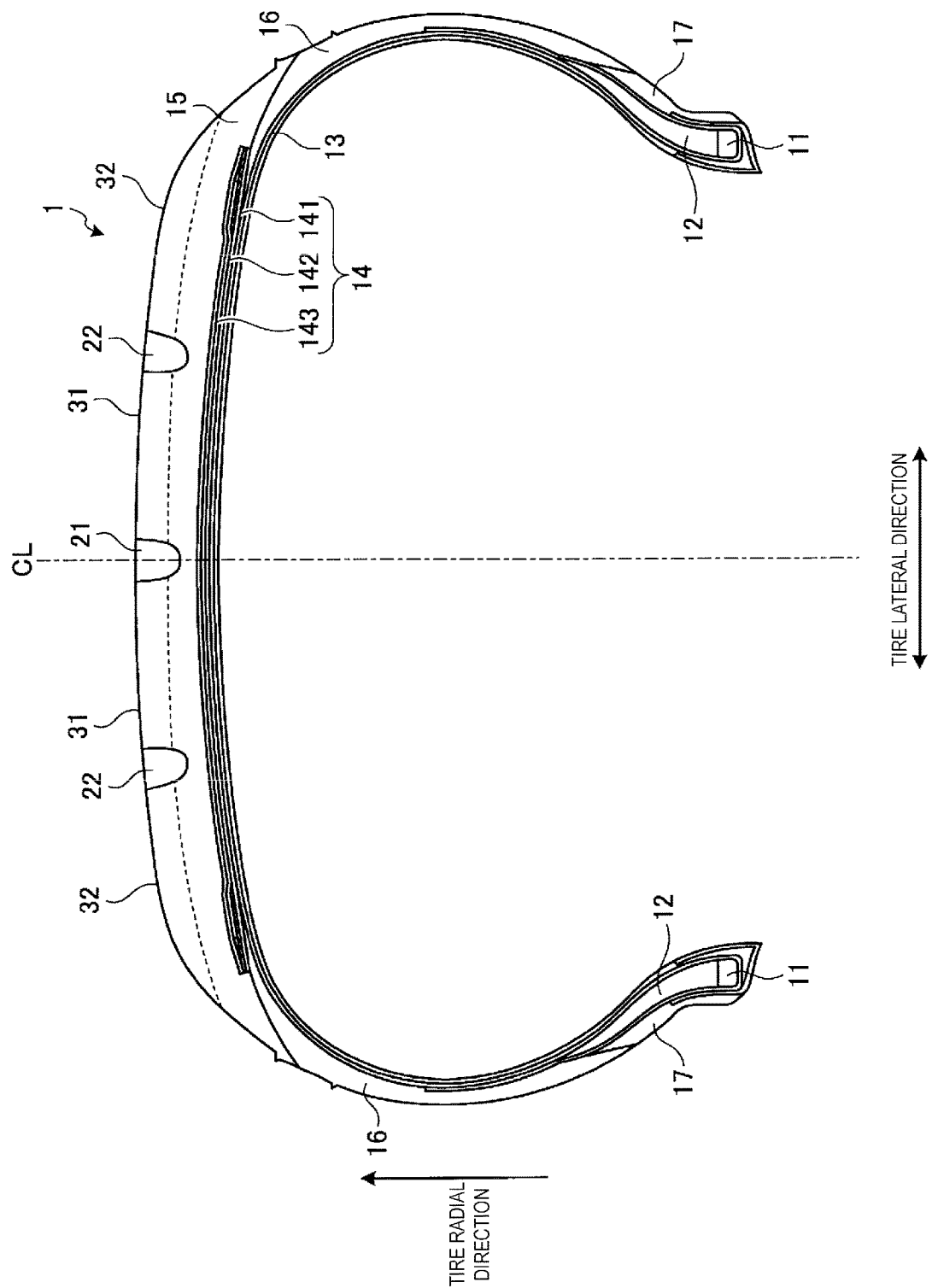
FIG. 1 is a cross-sectional view in a tire meridian direction illustrating a pneumatic tire according to an embodiment of the present technology.

FIG. 1 is a cross-sectional view in a tire meridian direction illustrating a pneumatic tire according to an embodiment of the present technology. The same drawing illustrates a cross-sectional view of a region to one side in the tire radial direction. Also, the same drawing illustrates a radial tire for a passenger vehicle as an example of a pneumatic tire.

In reference to the same drawing, "cross section in a tire meridian direction" refers to a cross section of the tire taken along a plane that includes the tire rotation axis (not illustrated). Reference sign CL denotes the tire equatorial plane and refers to a plane normal to the tire rotation axis that passes through the center point of the tire in the tire rotation axis direction. "Tire lateral direction" refers to the direction parallel with the tire rotation axis. "Tire radial direction" refers to the direction perpendicular to the tire rotation axis.

A pneumatic tire 1 has an annular structure with the tire rotation axis as its center and includes a pair of bead cores 11, 11, a pair of bead fillers 12, 12, a carcass layer 13, a belt layer 14, a tread rubber 15, a pair of sidewall rubbers 16, 16, and a pair of rim cushion rubbers 17, 17 (see FIG. 1).

The pair of bead cores 11, 11 are annular members constituted by a plurality of bead wires bundled together. The pair of bead cores 11, 11 constitute the cores of the left and right bead portions. The pair of bead fillers 12, 12 are disposed on peripheries of the pair of bead cores 11, 11 in the tire radial direction and constitute the bead portions.

The carcass layer 13 has a single-layer structure constituted by one carcass ply or a multilayer structure constituted by a plurality of layered carcass plies, and extends between the left and right bead cores 11, 11 in a toroidal shape, forming the framework of the tire. Additionally, both end portions of the carcass layer 13 are turned back outwardly in the tire lateral direction so as to wrap around the bead cores 11 and the bead fillers 12 and fixed. The carcass ply (plies) of the carcass layer 13 is constituted by a plurality of carcass cords formed from steel or an organic fiber material (e.g. aramid, nylon, polyester, rayon, or the like) covered by a coating rubber and subjected to a rolling process. The carcass ply (plies) has a carcass angle (defined as the inclination angle of the longitudinal direction of the carcass cords with respect to the tire circumferential direction), as an absolute value, of from 80 degrees to 95 degrees.

The belt layer 14 is formed by layering a pair of cross belts 141, 142 and a belt cover 143 and is disposed around the periphery of the carcass layer 13. The pair of cross belts 141, 142 are constituted by a plurality of belt cords formed from steel or an organic fiber material covered by a coating rubber and subjected to a rolling process. The cross belts 141, 142 have a belt angle, as an absolute value, of from 20 degrees to 55 degrees. Furthermore, the pair of cross belts 141, 142 have belt angles (defined as the inclination angle of the longitudinal direction of the belt cords with respect to the tire circumferential direction) of opposite signs, and the belts are layered so that the longitudinal directions of the belt cords intersect each other (crossply structure). The belt cover 143 is constituted by belt cords formed from steel or an organic fiber material covered by a coating rubber. The belt cover 143 has a belt angle, as an absolute value, of from 0 degrees to 10 degrees. The belt cover 143, for example, is a strip material constituted by one or a plurality of belt cords covered by a coating rubber. The strip material is wound in a spiral-like manner multiple times in the tire circumferential direction around the outer circumferential surface of the cross belts 141, 142. The belt cover 143 is disposed across the entire region of the cross belts 141, 142.

The tread rubber 15 is disposed outward of the carcass layer 13 and the belt layer 14 in the tire radial direction and constitutes a tread portion of the tire. The pair of sidewall rubbers 16, 16 are disposed outward of the carcass layer 13 in the tire lateral direction and constitute left and right sidewall portions. The pair of rim cushion rubbers 17, 17 are disposed inward of the left and right bead cores 11, 11 and the turned back portions of the carcass layer 13 in the tire radial direction. The pair of rim cushion rubbers 17, 17 constitute the contact surfaces of the left and right bead portions with the rim flanges.

Tread Pattern

Figure 2:
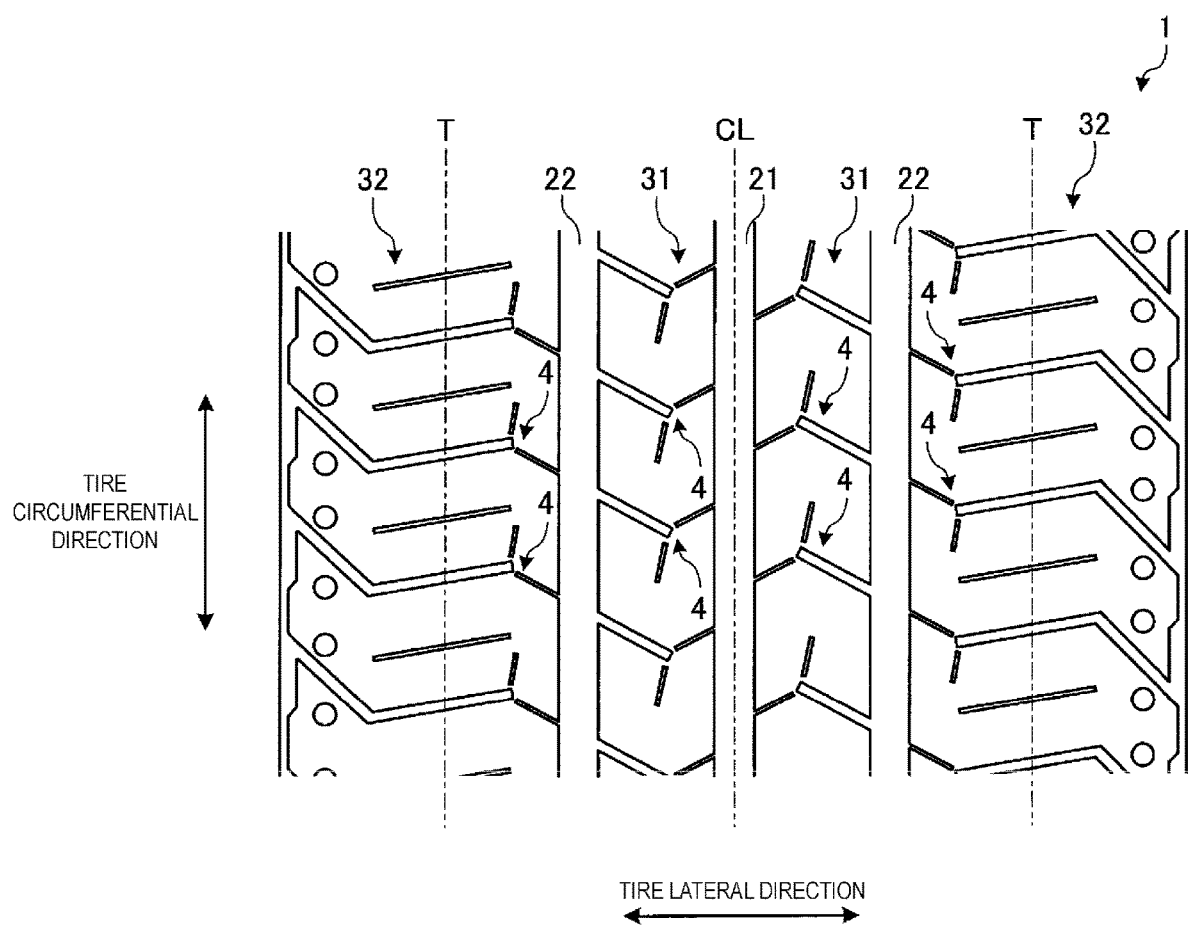
FIG. 2 is a plan view illustrating a tread surface of the pneumatic tire illustrated in FIG. 1.

FIG. 2 is a plan view illustrating a tread surface of the pneumatic tire illustrated in FIG. 1. The same drawing illustrates a tread pattern for an all-season tire. In reference to the same drawing, "tire circumferential direction" refers to the direction revolving about the tire rotation axis. Reference sign T denotes a tire ground contact edge.

As illustrated in FIG. 2, the pneumatic tire 1 includes a tread surface provided with a plurality of circumferential main grooves 21, 22 extending in the tire circumferential direction and a plurality of land portions 31, 32 defined by the circumferential main grooves 21, 22.

"Main groove" refers to a groove which is required to have a wear indicator as specified by JATMA (Japan Automobile Tyre Manufacturers Association, Inc.) and typically has a groove width of 4.0 mm or greater and a groove depth of 7.5 mm or greater.

The groove width is the maximum distance between the left and right groove walls at the groove opening portion and is measured when the tire is mounted on a specified rim, inflated to the specified internal pressure, and in an unloaded state. In configurations in which the land portions include notch portions or chamfered portions on the edge portions thereof, the groove width is measured with reference to the points where the tread contact surface and extension lines of the groove walls meet, when viewed in a cross-section normal to the groove length direction. Additionally, in configuration in which the grooves extend in a zigzag-like or wave-like manner in the tire circumferential direction, the groove width is measured with reference to the center line of the amplitude of the groove walls.

The groove depth is the maximum distance from the tread contact surface to the groove bottom and is measured when the tire is mounted on a specified rim, inflated to the specified internal pressure, and in an unloaded state. Additionally, in configurations in which the grooves include an uneven portion or sipes on the groove bottom, the groove depth is measured excluding these portions.

"Specified rim" refers to an "applicable rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). Additionally, "specified internal pressure" refers to a "maximum air pressure" defined by JATMA, to the maximum value in "TIRE LOAD LIMITS AT VARIOUS COLD INFLATION PRESSURES" defined by TRA, and to "INFLATION PRESSURES" defined by ETRTO. Additionally, "specified load" refers to a "maximum load capacity" defined by JATMA, the maximum value in "TIRE LOAD LIMITS AT VARIOUS COLD INFLATION PRESSURES" defined by TRA, and a "LOAD CAPACITY" defined by ETRTO. However, in the case of JATMA, for a passenger vehicle tire, the specified internal pressure is an air pressure of 180 kPa, and the specified load is 88% of the maximum load capacity.

For example, in the configuration of FIG. 2, three circumferential main grooves 21, 22 are disposed having left-right symmetry about the tire equatorial plane CL. Additionally, one of the circumferential main grooves 21 is disposed on a tire equatorial plane CL. The circumferential main grooves 21, 22 define four land portions 31, 32.

However, no such limitation is intended, and four or more circumferential main grooves may be disposed, and the circumferential main grooves may be disposed with left-right asymmetry with respect to the tire equatorial plane CL (not illustrated). Additionally, one of the circumferential main grooves may be disposed at a position offset from the tire equatorial plane CL and a land portion may be disposed on the tire equatorial plane CL (not illustrated).

Herein, of the two or more circumferential main grooves disposed in one of the regions on either side of the tire equatorial plane CL (including on the tire equatorial plane CL), the circumferential main grooves 22, 22 located outermost in the tire lateral direction are defined as outermost circumferential main grooves.

The region located inward of the left and right outermost circumferential main grooves 22, 22 in the tire lateral direction is defined as a center region, and the regions located outward thereof are defined as shoulder regions. Additionally, the land portions 31, 31 located in the center region are defined as center land portions, and the land portions 32, 32 located in the shoulder regions are defined as shoulder land portions.

In the configuration of FIG. 2, the circumferential main grooves 21, 22 have a straight shape. However, no such limitation is intended, and the circumferential main grooves 21, 22 may have a zigzag shape or a wave-like shape with amplitude in the tire lateral direction (not illustrated).

In the configuration of FIG. 2, the pneumatic tire 1 has a tread pattern with left-right point symmetry with respect to a point on the tire equatorial plane CL. However, no such limitation is intended, and, for example, the pneumatic tire 1 may have a tread pattern with left-right line symmetry or left-right asymmetry with respect to the tire equatorial plane CL, or with directionality in the tire rotation direction (not illustrated).

Groove Unit

Figure 3:
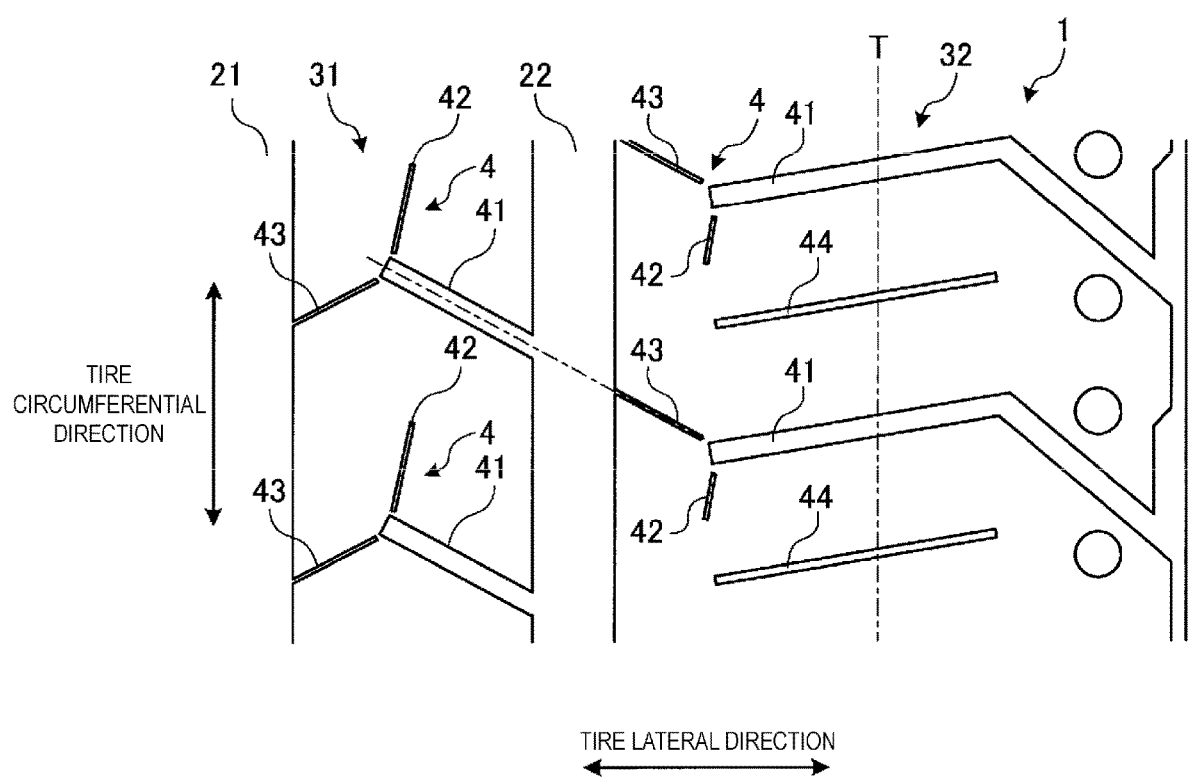
FIG. 3 is an enlarged view illustrating a main portion of the tread pattern illustrated in FIG. 2.
Figure 4:
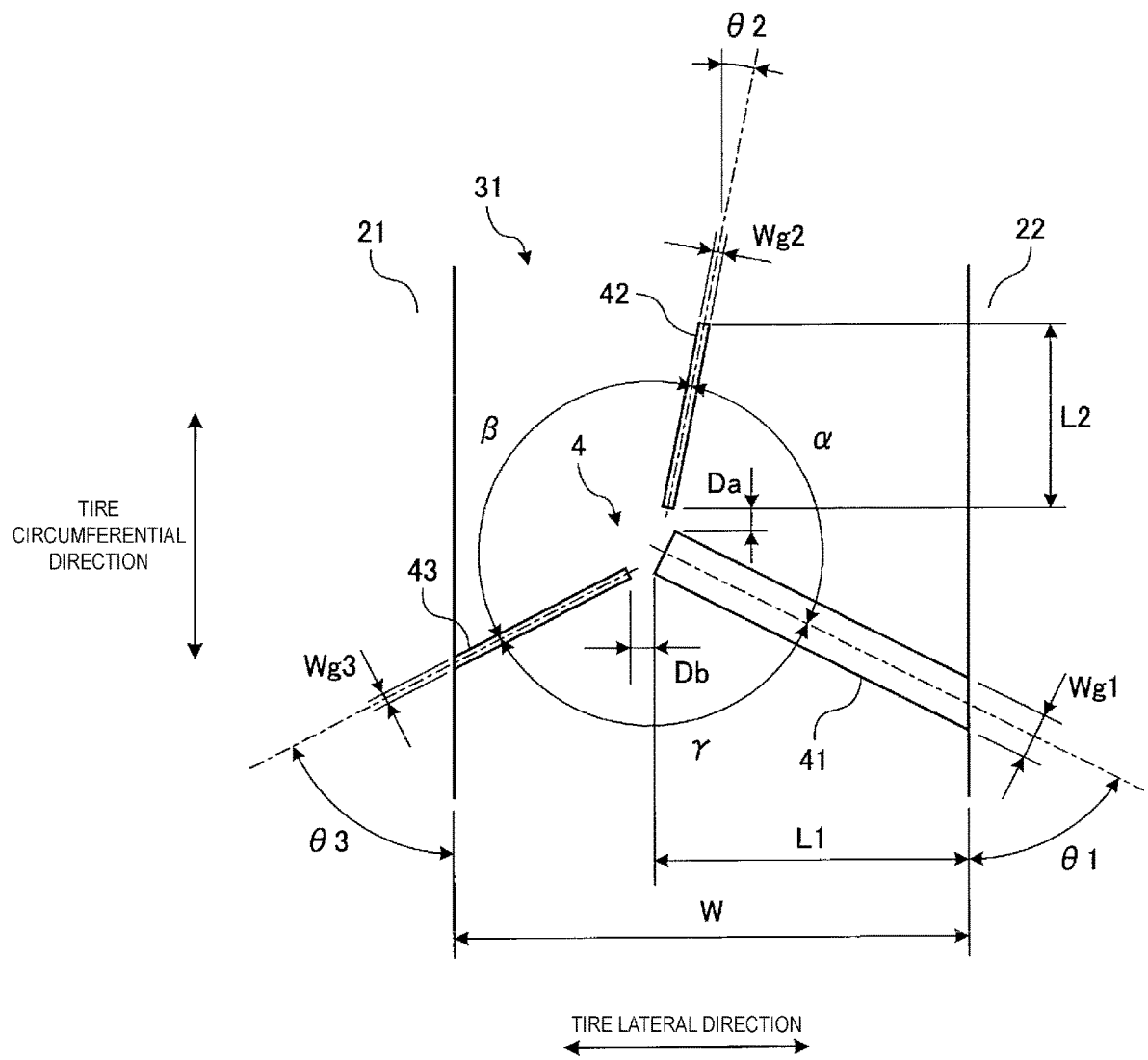
FIG. 4 is an enlarged view illustrating a main portion of the tread pattern illustrated in FIG. 2.
Figure 5:
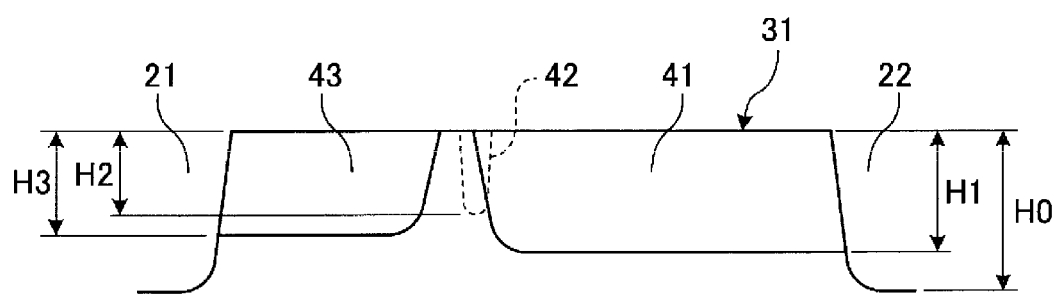
FIG. 5 is an enlarged view illustrating a main portion of the tread pattern illustrated in FIG. 2.

FIGS. 3 to 5 are enlarged views illustrating main portions of the tread pattern illustrated in FIG. 2. FIG. 3 is an enlarged view of a half region of the tread pattern on one side of the tire equatorial plane CL. FIG. 4 is an enlarged view of a groove unit 4. FIG. 5 is a cross-sectional view taken along the groove depth direction of a first groove 41 and a third groove 43 of the groove unit 4 illustrated in FIG. 4.

As illustrated in FIG. 3, each of the land portions 31, 32 are provided with a plurality of the groove units 4. The groove unit 4 is a set including the first groove 41, a second groove 42, and the third groove 43. Additionally, the groove units 4 are disposed at predetermined intervals in the tire circumferential direction. The grooves 41 to 43 ensure the wet performance of the tire.

As illustrated in FIG. 4, the first groove 41, the second groove 42, and the third groove 43 are disposed without meeting one another. In other words, the three grooves 41 to 43 are spaced apart without communicating. Thus, the land portions 31, 32 are not divided by the grooves 41 to 43 of the groove units 4 and include a continuous road contact surface in the tire circumferential direction. As a result, the rigidity of the land portions 31, 32 is ensured, and the steering stability performance of the tire on dry road surfaces is improved.

Additionally, the first groove 41, the second groove 42, and the third groove 43 radially extend at intervals from each other ranging from 90 degrees to 150 degrees. Specifically, an angle α formed by the first groove 41 and the second groove 42, angle β formed by the second groove 42 and the third groove 43, and angle γ formed by the third groove 43 and the first groove 41 all range from 90 degrees to 150 degrees. The angles α to γ preferably range from 105 degrees to 135 degrees. By radially disposing the grooves 41 to 43 of the groove unit 4 at predetermined intervals, compared to a configuration in which the grooves 41 to 43 are unevenly distributed, the rigidity of the land portions is appropriately ensured and the dry performance of the tire is efficiently improved.

Additionally, in the region around the outside of the groove unit 4, specifically, the triangular region formed by joining the end portions of the three grooves 41 to 43, no other grooves or sipes are disposed, giving the land portion 31 a continuous road contact surface. As a result, the rigidity of the land portions 31, 32 is efficiently ensured and the dry performance of the tire is efficiently improved. Additionally, the snow performance of the tire is improved.

The angles α, β, γ of the grooves 41 to 43 are defined as the angles formed by the imaginary lines joining both end portions of the grooves 41 to 43.

The first groove 41 is a lug groove with a groove width Wg1 (see FIG. 4) ranging from 1.5 mm to 4.0 mm and mainly extends in the tire lateral direction. The groove width Wg1 of the first groove 41 is preferably in the range of 1.7 mm≤Wg1≤2.5 mm. By the first groove 41 opening to the tire contact surface and exhibiting a drainage effect and edge effect, the wet performance and snow performance of the tire are increased. Additionally, the first groove 41 has a semi-closed structure, opening to the circumferential main groove 22 or the tire ground contact edge T at a first end portion (see FIG. 3) and terminating within the land portion 31 at a second end portion. As illustrated in FIG. 3, the first groove 41 preferably opens to the circumferential main groove 22 located outward of the land portion 31 in the tire lateral direction or the tire ground contact edge T. As a result, the drainage effect and snow performance of the first groove 41 is improved.

Tire contact surface is defined as the contact surface between the tire and a flat plate when the tire is mounted on a specified rim, inflated to the specified internal pressure, placed vertically on the flat plate in a static state, and loaded with a load corresponding to the specified load.

The second groove 42 is a narrow groove or a sipe with a groove width ranging from 0.6 mm to 1.2 mm and mainly extends in the tire circumferential direction. The second groove 42 is preferably a sipe with a groove width Wg2 of less than 1.0 mm that closes in the tire contact surface. The water pickup effect on wet road surfaces of the second groove 42 increases the wet performance of the tire. Additionally, the second groove 42 increases the gripping effect on snow-covered road surfaces and icy road surfaces. Thus, the snow performance and performance on ice of the tire are increased. The second groove 42 has a closed structure with left and right end portions terminating within the land portions 31, 32. The second groove 42 extending in the tire circumferential direction has a narrower groove width than the first groove 41. Thus, the rigidity of the land portions 31, 32 is appropriately ensured and the dry performance of the tire is improved.

"Narrow groove" and "sipe" are differentiated by narrow grooves opening to the tire contact surface and sipes being closed to the tire contact surface.

The third groove 43 is a lug groove, a narrow groove, or a sipe with a groove width Wg3 ranging from 0.6 mm to 2.0 mm and mainly extends in the tire lateral direction. Additionally, the third groove 43 has a semi-closed structure, opening to the circumferential main groove 21 at a first end portion and terminating within the land portion 31 at a second end portion. The third groove 43 extends on the side opposite the first groove 41 and opens to the circumferential main groove 21, 22 of the land portion 31, 32 (see FIGS. 2 and 3) on the side proximal to the tire equatorial plane CL.

Additionally, the groove width Wg1 of the first groove 41 and the groove width Wg2 of the second groove 42 and the groove width Wg3 of the third groove 43 have the relationships Wg2<Wg1 and Wg3<Wg1. In other words, the first groove 41, which is a lug groove, has the widest groove width Wg1. Thus, the first groove 41 functions effectively as a lug groove, and the wet performance of the tire is improved.

The groove width Wg2 of the second groove 42 and the groove width Wg1 of the first groove 41 and the groove width Wg3 of the third groove 43 have the relationships Wg2<Wg3 and Wg2<Wg1. In other words, the second groove 42, which mainly extends in the tire circumferential direction, has the narrowest groove width Wg2. As a result, the rigidity of the land portions 31, 32 is ensured and the dry performance of the tire is ensured.

Note that the difference between the groove widths Wg1 to Wg3 is preferably 0.1 mm or greater.

In FIG. 4, an inclination angle θ1 of the first groove 41 with respect to the tire circumferential direction is preferably in the range 30 degrees≤θ1≤60 degrees, and more preferably in the range 40 degrees≤θ1≤50 degrees. As a result, the drainage effect of the first groove 41 is improved and the function of the first groove 41 as a lug groove is ensured.

An inclination angle θ2 of the second groove 42 with respect to the tire circumferential direction is preferably in the range 0 degrees≤θ2≤30 degrees, and more preferably in the range 0 degrees≤θ2≤20 degrees. The second groove 42 may be inclined toward the first groove 41 (see FIG. 4) or may be inclined toward the third groove 43 (not illustrated) as it extends from the central portion of the groove unit 4 to the peripheral portion.

The inclination angles θ1 to θ3 are defined as the angles formed by the imaginary lines joining both end portions of the grooves 41 to 43 and the tire circumferential direction and range from 0 degrees to 90 degrees.

Additionally, the inclination angle θ2 of the second groove 42 with respect to the tire circumferential direction and the inclination angle θ1 of the first groove 41 with respect to the tire circumferential direction and the inclination angle θ3 of the third groove 43 with respect to the tire circumferential direction have the relationships θ2<θ1 and θ2<θ3. In other words, the second groove 42 mainly extends in the tire circumferential direction. As a result, the other grooves 41, 43 mainly extend in the tire lateral direction in accordance with the restrictions described above relating to the intervals of angles α, β, γ.

For example, in the configuration of FIG. 4, the terminating end portions of the first groove 41, the second groove 42, and the third groove 43 face one another in the central portion of the land portion 31, this point being the center from which they radially extend. Additionally, the first groove 41 is inclined with the inclination angle θ1 with respect to the tire circumferential direction and opens to the circumferential main groove 22 located outward in the tire lateral direction (see FIG. 3). The third groove 43 is inclined with the inclination angle θ3 in the opposite direction to the first groove 41 and opens to the circumferential main groove 21 located proximal to the tire equatorial plane CL. As a result, the first groove 41 and the third groove 43 are disposed in a V-shape projecting in the tire circumferential direction. The second groove 42 extends with the inclination angle θ2 with respect to the projecting direction of the V-shape of the first groove 41 and the third groove 43. As a result, the second groove 42 extends in the tire circumferential direction in the central portion of the land portion 31, and the first groove 41 and the third groove 43 extend to the left and right in the tire lateral direction on either side of the second groove 42.

As illustrated in FIG. 4, near every one of the first grooves 41, two grooves, the second groove 42 and the third groove 43, are disposed. Specifically, a distance Da between the first groove 41 and the second groove 42 and a distance Db between the first groove 41 and the third groove 43 have the relationships 1.0 mm≤Da≤5.0 mm and 1.0 mm≤Db≤5.0 mm. A distance (dimension symbol omitted from the drawings) between the second groove 42 and the third groove 43 is not particularly limited, but, similar to the distances Da, Db, preferably has the range 1.0 mm≤Dc≤5.0 mm.

The distances Da to Dc are the distances between adjacent grooves 41 to 43 in the tread contact surface.

For example, in the configuration of FIG. 4, the terminating end portions of the three grooves 41 to 43, as described above, face one another in the central portion of the land portion 31, this point being the center from which they radially extend. The first groove 41 and the second groove 42 are disposed spaced apart from one another in the tire circumferential direction without overlapping in the tire circumferential direction. The first groove 41 and the second groove 42 are closest to one another at the terminating end portions within the land portion 31. Thus, the distance Da between the adjacent grooves 41, 42 is the distance between the terminating end portions of the grooves 41, 42.

The first groove 41 and the third groove 43 are disposed spaced apart from one another in the tire lateral direction without overlapping in the tire lateral direction. The first groove 41 and the third groove 43 are closest to one another at the terminating end portions within the land portion 31. Thus, the distance Db between the adjacent grooves 41, 43 is the distance between the terminating end portions of the grooves 41, 43. In the configuration described above, the first groove 41 is disposed at different positions in the tire circumferential direction and the tire lateral direction to the second groove 42 and the third groove 43, which is preferable as the function of the grooves 41 to 43 can be efficiently obtained.

The second groove 42 is disposed spaced apart from the first groove 41 and the third groove 43 in the tire circumferential direction without overlapping in the tire circumferential direction. The third groove 43 is disposed spaced apart from the first groove 41 and the second groove 42 in the tire lateral direction without overlapping in the tire lateral direction. This configuration is preferable as the function of the second groove 42 and the third groove 43 can be efficiently obtained.

Furthermore, the first groove 41 and the third groove 43 are inclined in opposite directions with respect to the tire circumferential direction, and are disposed overlapping one another in the tire circumferential direction. As described above, the angle γ formed by the first groove 41 and the third groove 43 ranges from 90 degrees to 150 degrees. As a result, the first groove 41 is inclined with the predetermined angle θ1 with respect to the tire circumferential direction, making the positional relationship between the first groove 41 and the third groove 43 as described above.

In the configuration of FIG. 4, by the second groove 42 being inclined toward the first groove 41, the second groove 42 and the first groove 41 overlap each other in the tire lateral direction, and the second groove 42 and the third groove 43 do not overlap in the tire lateral direction. However, no such limitation is intended, and by the second groove 42 being inclined toward the third groove 43, the second groove 42 and the third groove 43 may overlap each other in the tire lateral direction.

In FIG. 4, an extension length L1 of the first groove 41 in the tire lateral direction and a width W of the land portions 31, 32 preferably have the relationship 0.4≤L1/W≤0.8, and more preferably the relationship 0.5≤L1/W≤0.7. As a result, the extension length L1 of the first groove 41 is appropriately set.

An extension length L2 of the second groove 42 in the tire circumferential direction and the width W of the land portions 31, 32 preferably have the relationship 0.2≤L2/W≤0.5, and more preferably the relationship 0.2≤L2/W≤0.3. As a result, the extension length L2 of the second groove 42 is appropriately set.

Note that an extension length L3 (reference sign omitted in the drawings) of the third groove 43 in the tire lateral direction is not particularly limited. However, the extension length L3 is restricted in relation to the extension length L1 of the first groove 41, the angle γ formed by the first groove 41 and the third groove 43, and the distance Db between the first groove 41 and the third groove 43.

The extension lengths L1, L3 of the first groove 41 and the third groove 43 are the distances in the tire lateral direction from the terminating end portions of the respective grooves 41, 43 to the opening portions to the circumferential main grooves 21, 22 or the tire ground contact edge T. Additionally, the extension length L2 of the second groove 42 is the distance in the tire circumferential direction between both terminating end portions of the groove 42.

The width W of the land portions 31, 32 is measured with the groove width of the circumferential main grooves 21, 22 or the tire ground contact edge T as a measuring point when the tire is mounted on a specified rim, inflated the specified internal pressure, and in an unloaded state.

Note that in the configuration of FIG. 4, the grooves 41 to 43 of the groove unit 4 all have a straight shape. However, no such limitation is intended, and the grooves 41 to 43 may have any shape such as an arc shape, a wave-like shape, a zigzag shape, and the like. For example, the second groove 42 or the third groove 43 may be a sipe with a zigzag shape.

In FIG. 5, a groove depth H0 of the circumferential main groove 22 and a groove depth H1 of the first groove 41 have the relationship $0.5 \leq H1/H0 \leq 0.9$. The groove depth H1 of the first groove 41 and a groove depth H2 of the second groove 42 and a groove depth H3 of the third groove 43 have the relationships $H2<H1$ and $H3<H1$. Accordingly, the groove depth H1 of the first groove 41 is the deepest compared to that of the other grooves 42, 43. As a result, the groove depth H1 of the first groove 41 is appropriately set.

The groove depth H0 of the circumferential main groove 22 and the groove depth H2 of the second groove 42 have the relationship $0.2 \leq H2/H0 \leq 0.5$. The groove depth H2 of the second groove 42 and the groove depth H1 of the first groove 41 and the groove depth H3 of the third groove 43 have the relationships $H2<H3$ and $H2<H1$. Accordingly, the groove depth H2 of the second groove 42 is the shallowest compared to that of the other grooves 41, 43. The groove depth H2 of the second groove 42 is preferably in the range $1.5 \text{ mm} \leq H2$. As a result, the shallowest groove depth H2 of the second groove 42 is appropriately ensured.

In the configuration of FIG. 2, as described above, the land portions 31, 32 defined by the circumferential main grooves 21, 22 are each provided with a plurality of the groove units 4. The first grooves 41 disposed in one of the adjacent land portions 31, 32 and the first grooves 41 disposed in the other land portion 31, 32 are disposed offset from one another in the tire circumferential direction. Specifically, the first groove 41 of one of the adjacent land portions 31, 32 and the first groove 41 of the other land portion 31, 32 when projected in the tire lateral direction are disposed such that they do not overlap. As a result, pattern noise caused by the first groove 41 is reduced and the noise performance of the tire is improved.

In the configuration of FIG. 2, as described above, the center land portions 31 and the shoulder land portions 32 are each provided with a plurality of the groove units 4. As illustrated in FIG. 3, the groove units 4 of the center land portions 31 each include the first groove 41 that opens to an outer edge portion of the center land portion 31 in the tire lateral direction. The groove units 4 of the shoulder land portions 32 each include the first groove 41 that opens to the tire ground contact edge T and the third groove 43 that opens to the inner edge portion of the shoulder land portion 32 in the tire lateral direction. The first grooves 41 of the center land portions 31 are located on extension lines of the third grooves 43 of the shoulder land portions 32. In other words, the first grooves 41 of the center land portions 31 and the third grooves 43 of the shoulder land portions 32 are disposed on a single straight line or a single arc. As a result, when the tire rolls, the drainage properties from the first grooves 41 of the center land portions 31 to the third grooves 43 of the shoulder land portions 32 is improved, and the wet performance of the tire is improved.

As illustrated in FIG. 3, the inclination direction of the first groove 41 disposed in the center land portion 31 and the inclination direction of the first groove 41 disposed in the shoulder land portion 32 are opposite to one another. Specifically, while extending outward in the tire lateral direction, the first groove 41 of the center land portion 31 is inclined downward as illustrated in the drawing, and the first groove 41 of the shoulder land portion 32 is inclined upward as illustrated in the drawing.

As illustrated in FIG. 3, the extension length L2 (see FIG. 4) in the tire circumferential direction of the second groove 42 disposed in the center land portion 31 is longer than the extension length L2 in the tire circumferential direction of the second groove 42 disposed in the shoulder land portion 32. As a result, the rigidity of the shoulder land portion 32 is ensured.

In the configuration of FIG. 3, the shoulder land portion 32 is provided with a fourth groove 44 between pairs of the first grooves 41, 41 adjacent in the tire circumferential direction. The fourth groove 44 is a lug groove, a narrow groove, or a sipe with a groove width ranging from 0.6 mm to 2.0 mm. Additionally, the fourth groove 44 has a semi-closed structure, opening to the tire ground contact edge T at a first end portion and terminating within the shoulder land portion 32 at a second end portion. A groove depth H4 (dimension symbol omitted from the drawings) of the fourth groove 44 is shallower than the groove depth H1 of the first groove 41 (see FIG. 5). The fourth groove 44 extends parallel with the first groove 41 and has the same groove length as the first groove 41 within the tire contact surface. In such a configuration, by providing the fourth groove 44, the rigidity of the shoulder land portion 32 in the tire circumferential direction is made uniform, and uneven wear of the shoulder land portion 32 is suppressed.

The fourth groove 44 is disposed at a position that does not meet with the groove unit 4 including the three grooves 41 to 43. Specifically, the fourth groove 44 is disposed in the position offset from the triangular region around the outside of the groove unit 4 (the region defined as the triangular region formed by joining the end portions of the three grooves 41 to 43). As a result, the rigidity of the land portions 31, 32 is efficiently ensured and the dry performance of the tire is efficiently improved. Additionally, the snow performance of the tire is improved.

MODIFIED EXAMPLES

Figure 6:
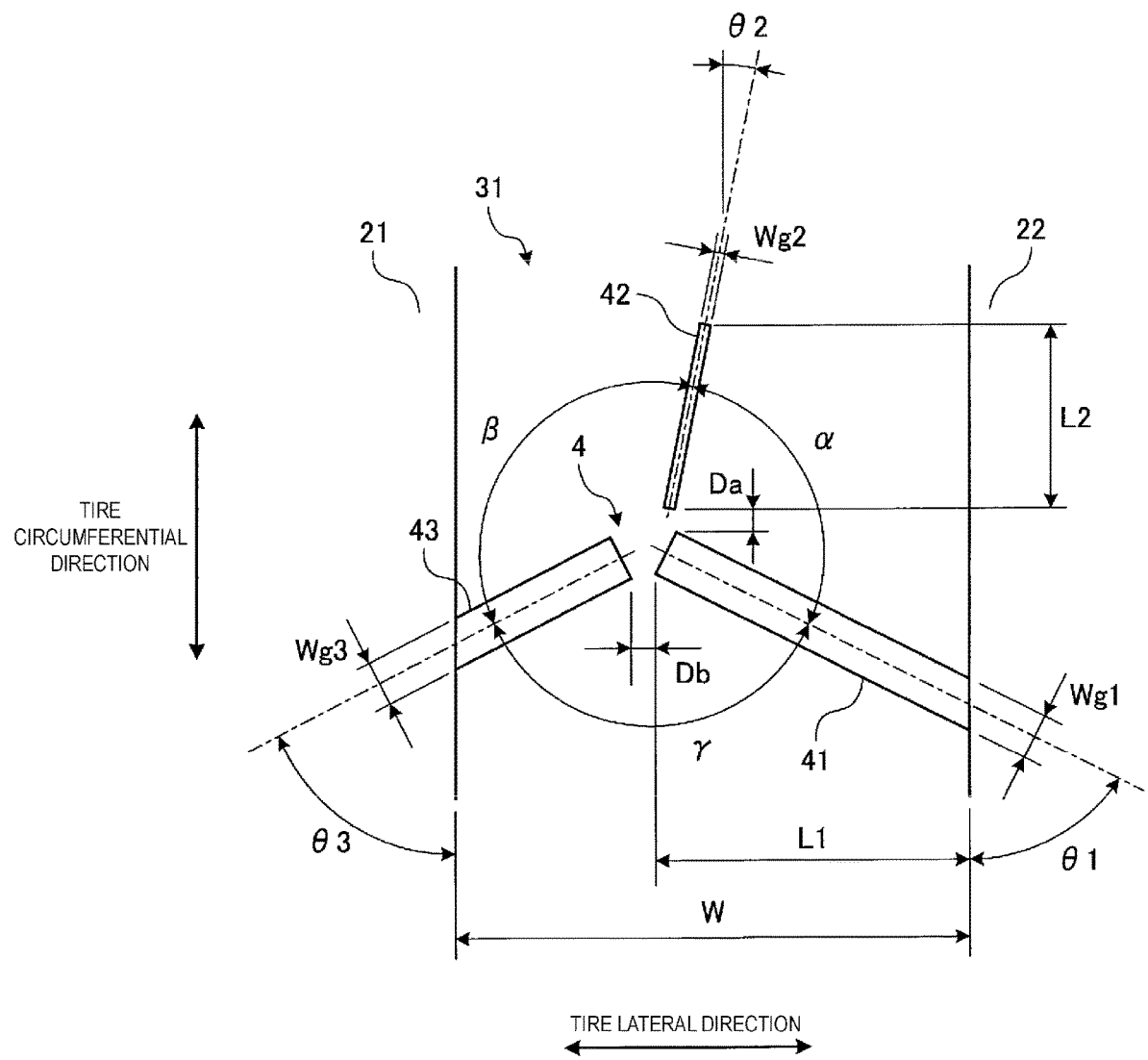
FIG. 6 is an explanatory diagram illustrating a modified example of the groove unit illustrated in FIG. 4.

FIG. 6 is an explanatory diagram illustrating a modified example of the groove unit illustrated in FIG. 4. The same drawing is an enlarged plan view of one groove unit 4 formed in the center land portion 31.

In the configuration of FIG. 4, the third groove 43 is a narrow groove or a sipe with the groove width Wg3 of 1.2 mm or less, and the groove width Wg3 is narrower than the groove width Wg1 of the first groove 41. Such a configuration is preferable because the rigidity of the land portion 31 is ensured and the dry performance of the tire is improved.

In the configuration of FIG. 6, the third groove 43 is a lug groove with the groove width Wg3 ranging from 1.5 mm to 4.0 mm, and the groove width Wg3 is the same as the groove width Wg1 of the first groove 41. Compared to the configuration of FIG. 4, this configuration has increased drainage effect and edge effect of the third groove 43. As a result, the wet performance and the snow performance of the tire is improved.

Effects

As described above, the pneumatic tire 1 includes the circumferential main grooves 21, 22 extending in the tire circumferential direction and the land portions 31, 32 defined by the circumferential main grooves 21, 22 (see FIG. 2). The land portions 31, 32 are each provided with a plurality of the groove units 4 which are sets including the first groove 41, the second groove 42, and the third groove 43 (see FIG. 3). The first groove 41, the second groove 42, the third groove 43 are disposed without meeting one another, and radially extend at the intervals α, β, γ from each other ranging from 90 degrees to 150 degrees (see FIG. 4). Additionally, the first groove 41 is a lug groove with the groove width Wg1 ranging from 1.5 mm to 4.0 mm and has a semi-closed structure, opening to the circumferential main groove 22 or the tire ground contact edge T at a first end portion and terminating within the land portion 31, 32 at a second end portion.

In such a configuration, (1) the groove unit 4 including a set of the three grooves 41 to 43 ensures the wet performance of the tire. (2) By the grooves 41 to 43 being disposed without meeting one another, the rigidity of the land portions 31, 32 are ensured and the dry performance of the tire is ensured. (3) By the grooves 41 to 43 radially extending at the intervals α, β, γ from each other ranging from 90 degrees to 150 degrees, compared to a configuration in which the grooves 41 to 43 are unevenly distributed, the rigidity of the land portions 31, 32 is efficiently ensured and the dry performance of the tire is efficiently improved. (4) By the first groove 41 being a lug groove, the drainage properties of the land portions 31, 32 are ensured and the wet performance of the tire is ensured. This has the advantage that good wet performance and dry performance can be provided.

In the pneumatic tire 1, the second groove 42 is a narrow groove or a sipe with the groove width Wg2 ranging from 0.6 mm to 1.2 mm and has a closed structure with left and right end portions terminating within the land portions 31, 32 (see FIG. 4). In such a configuration, the water pickup effect of the second groove 42 improves the wet performance of the tire. Additionally, compared to a configuration in which the second groove 42 is a wide lug groove, the rigidity of the land portions 31, 32 is ensured and the dry performance of the tire is improved. This has the advantage that good wet performance and dry performance can be provided.

Additionally, the inclination angle θ2 of the second groove 42 with respect to the tire circumferential direction and the inclination angle θ1 of the first groove 41 with respect to the tire circumferential direction have the relationship θ2<θ1 (see FIG. 4). In such a configuration, the inclination angle θ1 of the first groove 41, which has a wide groove width and good drainage, is prioritized and made larger than the inclination angle θ2 of the second groove 42. This has the advantage that wet performance is efficiently improved.

Additionally, in the pneumatic tire 1, the inclination angle θ2 of the second groove 42 with respect to the tire circumferential direction is within the range 0 degrees≤θ2≤30 degrees (see FIG. 4). In such a configuration, the second groove 42 extends in the tire circumferential direction and has a closed structure. As a result, the water pickup effect of the second groove 42 improves the wet performance of the tire.

Additionally, in the pneumatic tire 1, the third groove 43 is a lug groove, a narrow groove, or a sipe with the groove width Wg3 ranging from 0.6 mm to 2.0 mm and has a semi-closed structure, opening to the circumferential main groove 21, 22 at a first end portion and terminating within the land portion 31, 32 at a second end portion (see FIG. 4). This has the advantage that the groove width Wg3 of the third groove 43 is appropriately set.

In the pneumatic tire 1, the extension length L1 of the first groove 41 in the tire lateral direction and the width W of the land portions 31, 32 have the relationship 0.4≤L1/W≤0.8 (see FIG. 4). As a result, the extension length L1 of the first groove 41 can be appropriately set. In other words, by having the relationship 0.4≤L1/W, the extension length L1 of the first groove 41 is ensured and the drainage effect and edge components of the first groove 41 are ensured. Additionally, by having the relationship L1/W≤0.8, a decrease in rigidity of the land portions 31, 32 caused by the extension length L1 of the first groove 41 being excessive can be prevented.

In the pneumatic tire 1, the extension length L2 of the second groove 42 in the tire circumferential direction and the width W of the land portions 31, 32 have the relationship 0.2≤L2/W≤0.5 (see FIG. 4). As a result, the extension length L2 of the second groove 42 can be appropriately set. In other words, by having the relationship 0.2≤L2/W, the extension length L2 of the second groove 42 is ensured and the water pickup effect of the second groove 42 is ensured. Additionally, by having the relationship L2/W≤0.5, a decrease in rigidity of the land portions 31, 32 caused by the extension length L2 of the second groove 42 being excessive can be prevented.

Additionally, in the pneumatic tire 1, the groove width Wg1 of the first groove 41 and the groove width Wg2 of the second groove 42 and the groove width Wg3 of the third groove 43 have the relationships Wg2<Wg1 and Wg3<Wg1 (see FIG. 4). This has the advantage that the relationship between the groove widths Wg1 to Wg3 of the grooves 41 to 43 that constitute the groove unit 4 are appropriately set.

Additionally, in the pneumatic tire 1, the distance Da between the first groove 41 and the second groove 42 and the distance Db between the first groove 41 and the third groove 43 have the relationships 1.0 mm≤Da≤5.0 mm and 1.0 mm≤Db≤5.0 mm (see FIG. 4). In such a configuration, the three grooves 41 to 43 that constitute the groove unit 4 are disposed near one another. As a result, the groove units 4 can be efficiently disposed in the land portions 31, 32. Furthermore, by the terminating end portions of the three grooves 41 to 43 being disposed near one another, drainage properties can be improved and the wet performance of the tire can be improved.

In the pneumatic tire 1, the groove depth H0 of the circumferential main grooves 21, 22 and the groove depth H1 of the first groove 41 have the relationship 0.5≤H1/H0≤0.9 (see FIG. 5). As a result, the groove depth H1 of the first groove 41 can be appropriately set. In other words, by having the relationship 0.5≤H1/H0, the groove depth H1 of the first groove 41 is ensured and the drainage effect and edge components of the first groove 41 are ensured. Additionally, by having the relationship H1/H0≤0.9, a decrease in rigidity of the land portions 31, 32 caused by the groove depth H1 of the first groove 41 being excessive can be prevented.

In the pneumatic tire 1, the groove depth H1 of the first groove 41 and the groove depth H2 of the second groove 42 and the groove depth H3 of the third groove 43 have the relationships H2<H1 and H3<H1. This has the advantage that the relationship between the groove depths H1 to H3 of the grooves 41 to 43 that constitute the groove unit 4 are appropriately set.

In the pneumatic tire 1, the inner land portion (for example, the center land portions 31 of FIG. 2) and the outer land portion (for example, the shoulder land portions 32 of FIG. 2) are each provided with a plurality of the groove units 4. The groove units 4 of the inner land portion 31 each include the first groove 41 that opens to the outer edge portion of the inner land portion 31 in the tire lateral direction. The groove units 4 of the outer land portion 32 each include the third groove 43 that opens to the inner edge portion of the outer land portion 32 in the tire lateral direction (see FIG. 3). The first grooves 41 of the inner land portions 31 are located on extension lines of the third grooves 43 of the outer land portions 32. Such a configuration has the advantage that, by the first grooves 41 of the inner land portions 31 and the third grooves 43 of the outer land portions 32 being connected, drainage properties are improved and the wet performance of the tire is improved.

In the pneumatic tire 1, the left and right land portions 31, 32 defined by the circumferential main grooves 21, 22 are each provided with a plurality of the groove units 4 (see FIG. 2). The first grooves 41 disposed in one of the land portions 31 and the first grooves 41 disposed in the other land portion 32 are disposed offset from one another in the tire circumferential direction (see FIG. 3). This has the advantage that pattern noise caused by the first groove 41 is reduced and the noise performance of the tire is improved.

In the pneumatic tire 1, the land portions 32 located on the tire ground contact edges T and the other land portions 31 adjacent to these land portions 32 are each provided with a plurality of the groove units 4 (see FIG. 3). The inclination direction of the first grooves 41 disposed in one of the land portions 31 and the inclination direction of the first grooves 41 disposed in the other land portion 32 are opposite to one another. In such a configuration, the gripping force against the road surface when cornering when turning right and turning left is made uniform. This has the advantage of the steering stability performance (in particular turning performance) of the tire being ensured.

EXAMPLES

Figure 8:
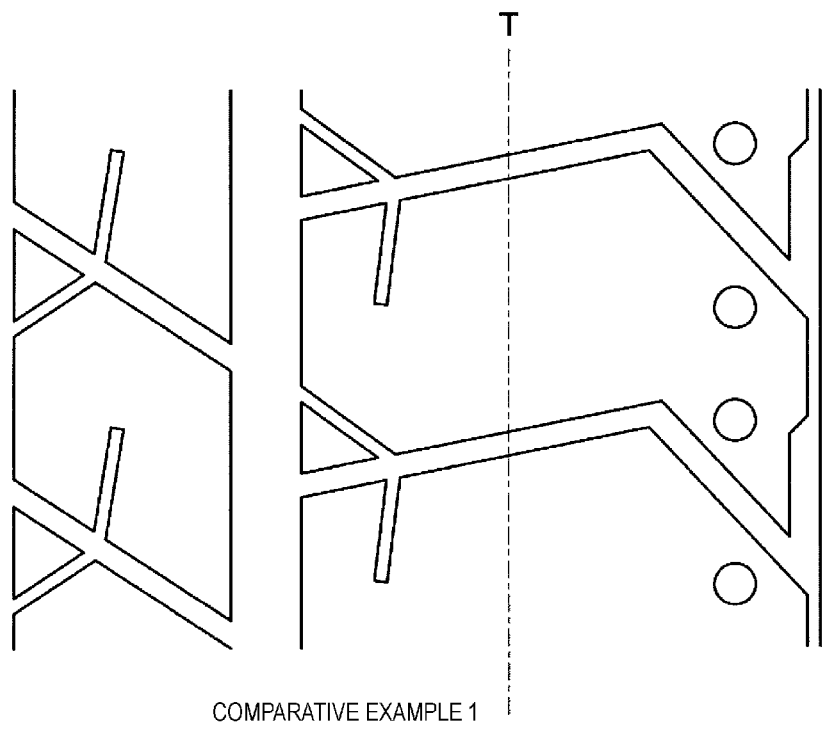
FIG. 8 is an explanatory drawing illustrating a test tire of a comparative example.
Figure 9:
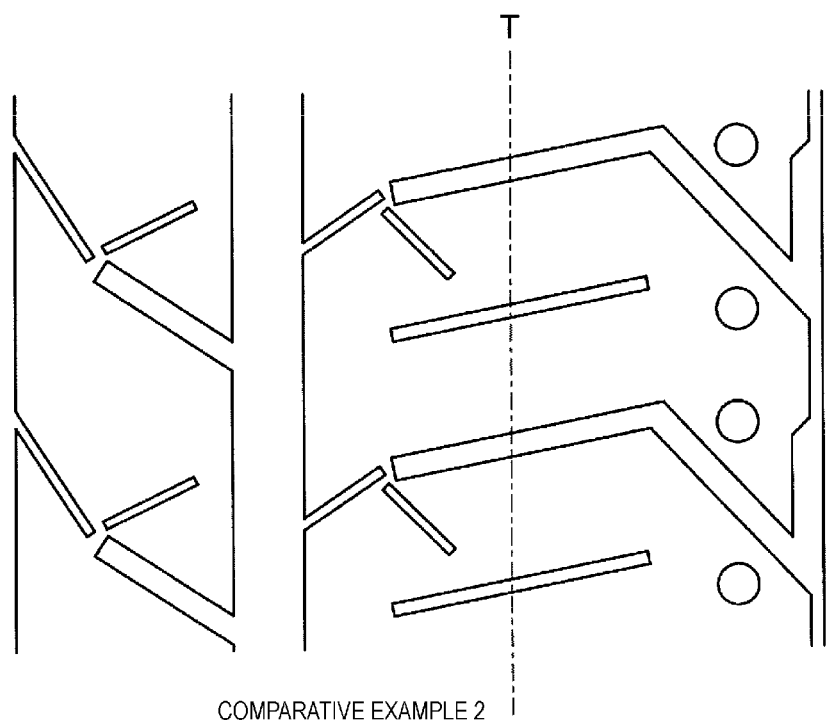
FIG. 9 is an explanatory drawing illustrating a test tire of a comparative example.

FIG. 7 is a table showing the results of performance tests of pneumatic tires according to embodiments of the present technology. FIGS. 8 and 9 are explanatory diagrams illustrating test tires of Comparative Example 1 (FIG. 8) and Comparative Example 2 (FIG. 9). These drawings are tread plan views of a center land portion and a shoulder land portion of a tire half region.

In the performance tests, a plurality of different test tires were evaluated for (1) wet performance and (2) dry performance. Test tires having a tire size of 155/65R14 75S were mounted on rims having a rim size of 14×4.5J, inflated to an air pressure of 230 kPa, and loaded with the maximum load defined by JATMA. The test tires were mounted on all of the wheels of a small passenger car with an engine displacement of 0.66 L.

(1) Evaluation of wet performance (wet steering stability performance): The test vehicle was driven on an asphalt road surface covered with 1 mm of water at 40 km/h. Then the test driver performed a sensory evaluation regarding steering while lane changing and cornering and stability while traveling forward. Results of the evaluation are expressed as index values with Comparative Example 1 assigned as the reference (100). In this evaluation, larger values are preferable.

(2) Evaluation of dry performance (dry steering stability performance): The test vehicle was driven at a speed of from 60 km/h to 100 km/h on a dry road surface test course with a flat circuit. Then the test driver performed a sensory evaluation regarding steering while lane changing and cornering and stability while traveling forward. Results of the evaluation are expressed as index values with Comparative Example 1 assigned as the reference (100). In this evaluation, larger values are preferable.

The test tires of Examples 1 to 10 have the configuration of FIGS. 1 to 3, and include a plurality of the groove units 4 including the three grooves 41 to 43 radially disposed. The width W of the center land portion 31 is W=20 mm. The width direction length L1 of the first groove 41 and the circumferential length L2 of the second groove 42 of the center land portions 31 are L1=12 mm and L2=8.0 mm. The groove depth H0 of the outermost circumferential main groove 22 is H0=6.5 mm. In Example 1, the groove depths H1 to H3 of the first groove 41 to third groove 43 of the center land portions 31 are H1=5.0 mm, H2=2.0 mm, and H3=4.0 mm.

In the test tire of Comparative Example 1 (see FIG. 8), the first groove extends through the center land portion and communicates with the circumferential main groove on the left and right of the land portion. Additionally, the second groove and the third groove communicate with the first groove. The test tire of Comparative Example 2 (see FIG. 9), has the same configuration as Example 1 except that the intervals α, β, γ (see FIG. 4) between the three grooves 41 to 43 of the groove unit 4 are unbalanced.

As can be seen from the test results, the test tires of Examples 1 to 10 can provide good wet performance and dry performance in a compatible manner.

The invention claimed is:

1. A pneumatic tire, comprising:
   a plurality of circumferential main grooves extending in a tire circumferential direction; and
   a plurality of land portions defined by the circumferential main grooves;
   a center land portion of the plurality of land portions comprising a plurality of groove units each only composed of a first groove, a second groove, and a third groove;
   the first groove, the second groove, and the third groove being disposed without meeting one another and radially extending at intervals from each other ranging from 90 degrees to 150 degrees;
   the first groove being a lug groove with a groove width ranging from 1.5 mm to 4.0 mm and having a semi-closed structure, opening to one of the circumferential main grooves at a first end portion and terminating within the land portion at a second end portion;
   an inclination angle $\theta 1$ of the first groove with respect to the tire circumferential direction being in a range 30 degrees$\leq \theta 1 \leq 60$ degrees measured either clockwise or counter-clockwise with respect to the tire circumferential direction;
   an inclination angle $\theta 2$ of the second groove with respect to the tire circumferential direction is within a range 5 degrees$\leq \theta 2 \leq 30$ degrees; and
   the center land portion has no other groove between the groove units adjacent to each other in the tire circumferential direction.

2. The pneumatic tire according to claim 1, wherein the second groove is a narrow groove or a sipe with a groove width ranging from 0.6 mm to 1.2 mm and has a closed structure, terminating within the land portion at left and right end portions.

3. The pneumatic tire according to claim 1, wherein the inclination angle $\theta 2$ of the second groove with respect to the tire circumferential direction and the inclination angle $\theta 1$ of the first groove with respect to the tire circumferential direction and an inclination angle $\theta 3$ of the third groove with respect to the tire circumferential direction have relationships θ2<θ1 and θ2<θ3, each of the angles θ1, θ2 and θ3 being an acute angle measured either clockwise or counterclockwise with respect to the tire circumferential direction.

4. The pneumatic tire according to claim 1, wherein the third groove is a lug groove, a narrow groove, or a sipe with a groove width ranging from 0.6 mm to 2.0 mm and has a semi-closed structure, opening to an other one of the circumferential main grooves at a first end portion and terminating within the land portion at a second end portion.

5. The pneumatic tire according to claim 1, wherein an extension length L1 of the first groove in a tire lateral direction and a width W of the land portion have a relationship 0.4≤L1/W≤0.8.

6. The pneumatic tire according to claim 1, wherein an extension length L2 of the second groove in the tire circumferential direction and the width W of the land portion have a relationship 0.2≤L2/W≤0.5.

7. The pneumatic tire according to claim 1, wherein a groove width Wg1 of the first groove and a groove width Wg2 of the second groove and a groove width Wg3 of the third groove have relationships Wg2<Wg1 and Wg3<Wg1.

8. The pneumatic tire according to claim 1, wherein a shortest distance Da between the first groove and the second groove and a shortest distance Db between the first groove and the third groove have relationships 1.0 mm≤Da≤5.0 mm and 1.0 mm≤Db≤5.0 mm.

9. The pneumatic tire according to claim 1, wherein a groove depth H0 of the circumferential main grooves and a groove depth H1 of the first groove have a relationship 0.5≤H1/H0≤0.9.

10. The pneumatic tire according to claim 1, wherein a groove depth H1 of the first groove and a groove depth H2 of the second groove and a groove depth H3 of the third groove have relationships H2<H1 and H3≤H1.

11. The pneumatic tire according to claim 1, wherein
the plurality of land portions defined by the circumferential main grooves comprise an inner land portion located inward in a tire lateral direction toward a tread center and an outer land portion located outward in the tire lateral direction toward a tread edge;
the inner land portion and the outer land portion each comprise the plurality of groove units;
the plurality of groove units of the inner land portion each comprise the first groove that opens to an outer edge portion of the inner land portion in the tire lateral direction;
the plurality of groove units of the outer land portion each comprise the third groove that opens to an inner edge portion of the outer land portion in the tire lateral direction; and
the first groove of the inner land portion and the third groove of the outer land portion are disposed on a single straight line or a single arc.

12. The pneumatic tire according to claim 1, wherein
the plurality of land portions defined by the circumferential main grooves each comprise the plurality of groove units; and
the first grooves disposed in one of the land portions and the first grooves disposed in an other land portion are disposed offset from one another in the tire circumferential direction.

13. The pneumatic tire according to claim 1, wherein
a first land portion located on the tire ground contact edge and a second land portion directly adjacent to the first land portion located on the tire ground contact edge each comprise the plurality of groove units; and
an inclination direction of the first grooves disposed in one of either the first land portion or the second land portion and an inclination direction of the first grooves disposed in an other land portion are opposite to one another in the tire circumferential direction.

14. The pneumatic tire according to claim 1, wherein a first land portion located on the tire ground contact edge and a second land portion directly adjacent to the first land portion located on the tire ground contact edge each comprise the plurality of groove units; and an extension length in the tire circumferential direction of the second grooves disposed in the first land portion located on the tire ground contact edge is shorter than an extension length in the tire circumferential direction of the second grooves disposed in the second land portion.

15. The pneumatic tire according to claim 1, wherein by the second groove being inclined toward the first groove, the second groove and the first groove overlap each other in a tire lateral direction, or by the second groove being inclined toward the third groove, the second groove and the third groove overlap each other in the tire lateral direction.

16. The pneumatic tire according to claim 1, wherein the first groove, the second groove, and the third groove being disposed without meeting one another and radially extending at intervals from each other ranging from 105 degrees to 135 degrees.

17. The pneumatic tire according to claim 1, wherein the first groove and the third groove are disposed in a V-shape projecting in the tire circumferential direction, and the plurality of groove units adjacent to each other in the tire circumferential direction are arranged so that the V-shape is oriented in a same direction in the tire circumferential direction.

18. The pneumatic tire according to claim 1, wherein the second groove of the center land portion is inclined toward a tire ground contact edge side from the second end portion of the first groove toward the first end portion of the first groove.

19. The pneumatic tire according to claim 1, wherein an extension length L2 of the second groove in the tire circumferential direction and the width W of the land portion satisfy 0.3≤L2/W≤0.5, and a groove depth H2 of the second groove satisfies 1.5 mm≤H2.

20. The pneumatic tire according to claim 1, wherein the first groove and the third groove are disposed spaced apart from one another in a tire lateral direction without overlapping in the tire lateral direction, and a shortest distance Db between the first groove and the third groove satisfy 1.0 mm≤Db≤5.0 mm.

21. A pneumatic tire, comprising:
a plurality of circumferential main grooves extending in a tire circumferential direction; and
a plurality of land portions defined by the circumferential main grooves;
a center land portion of the plurality of land portions comprising a plurality of groove units each only composed of a first groove, a second groove, and a third groove;
the first groove, the second groove, and the third groove being disposed without meeting one another and radially extending at intervals from each other ranging from 90 degrees to 150 degrees;
the first groove being a lug groove with a groove width ranging from 1.5 mm to 4.0 mm and having a semi-closed structure, opening to one of the circumferential main grooves at a first end portion and terminating within the land portion at a second end portion;

a groove width Wg2 of the second groove and a groove width Wg1 of the first groove and the groove width Wg3 of the third groove having relationships Wg2<Wg3 and Wg2<Wg1; and the center land portion has no other groove between the groove units adjacent to each other in the tire circumferential direction.

22. The pneumatic tire according to claim 21, wherein the second groove has a groove width Wg2 ranging from 0.6 mm to 1.2 mm, the third groove has a groove width Wg3 ranging from 0.6 mm to 2.0 mm, and a difference (Wg3−Wg2) is 0.1 mm or greater.

23. The pneumatic tire according to claim 21, wherein the second groove has a groove width Wg2 of from 0.6 mm to less than 1.0 mm, the third groove has a groove width Wg3 of from 0.6 mm to 1.2 mm or less, and a difference (Wg3−Wg2) is 0.1 mm or greater.

24. The pneumatic tire according to claim 21, wherein the groove widths Wg1, Wg2 and Wg3 satisfy Wg2<Wg3<Wg1.

25. The pneumatic tire according to claim 21, wherein the first groove opens at an edge portion of the center land portion on a tire ground contact end side.

26. The pneumatic tire according to claim 21, wherein an extension length L1 of the first groove in a tire lateral direction and a width W of the land portion have the relationship 0.4≤L1/W≤0.8, and an extension length L2 of the second groove in the tire circumferential direction and the width W of the land portion satisfy 0.3≤L2/W≤0.5.

27. The pneumatic tire according to claim 21, wherein a shortest distance Da between the first groove and the second groove and a shortest distance Db between the first groove and the third groove satisfy 1.0 mm 5 Da<5.0 mm and 1.0 mm<Db 5 5.0 mm.

28. A pneumatic tire, comprising:
a plurality of circumferential main grooves extending in a tire circumferential direction; and
a plurality of land portions defined by the circumferential main grooves;
a first land portion located on the tire ground contact edge and a second land portion directly adjacent to the first land portion of the plurality of land portions comprising a plurality of groove units each composed of a first groove, a second groove, and a third groove;

the first groove, the second groove, and the third groove being disposed without meeting one another and radially extending at intervals from each other ranging from 90 degrees to 150 degrees;

the first groove being a lug groove with a groove width ranging from 1.5 mm to 4.0 mm and having a semi-closed structure, opening to one of the circumferential main grooves or a tire ground contact edge at a first end portion and terminating within the land portion at a second end portion;

an inclination angle θ1 of the first groove with respect to the tire circumferential direction being in a range 30 degrees≤θ1≤60 degrees measured either clockwise or counter-clockwise with respect to the tire circumferential direction;

an inclination direction of the first grooves disposed in one of either the first land portion or the second land portion and an inclination direction of the first grooves disposed in an other land portion are opposite to one another in the tire circumferential direction; and the first groove of the second land portion opening at an outer edge portion of the second land portion in the tire width direction.

29. The pneumatic tire according to claim 28, wherein the third groove of the first land portion and the first groove of the second land portion are inclined in the same direction in the tire circumferential direction, and are arranged on a single straight line or a single arc.

30. The pneumatic tire according to claim 28, wherein the third groove has a groove width Wg3 of from 0.6 mm to 1.2 mm or less.

31. The pneumatic tire according to claim 28, wherein a distance Da between the first groove and the second groove and a distance Db between the first groove and the third groove have the relationships 1.0 mm≤Da≤5.0 mm and 1.0 mm≤Db≤5.0 mm.

32. The pneumatic tire according to claim 28, wherein the second groove is separated from both the first groove and the third groove in the tire circumferential direction and does not overlap in the tire circumferential direction.

* * * * *